United States Patent
Li et al.

(10) Patent No.: US 6,643,280 B1
(45) Date of Patent: Nov. 4, 2003

(54) METHOD AND APPARATUS FOR GENERATION OF CDMA LONG CODES

(75) Inventors: Quinn Li, Madison, NJ (US); Nallepilli S. Ramesh, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/428,513

(22) Filed: Oct. 27, 1999

(51) Int. Cl.[7] ............................. H04B 7/216; H04B 1/69
(52) U.S. Cl. ..................... 370/342; 370/335; 375/149
(58) Field of Search ................................ 370/209, 320, 370/335, 342, 441; 375/130, 140, 145, 146, 147, 149; 708/250, 252; 341/61

(56) References Cited

U.S. PATENT DOCUMENTS

| | | | | |
|---|---|---|---|---|
| 5,559,829 A | * | 9/1996 | Le Strat et al. | 375/141 |
| 5,631,922 A | * | 5/1997 | Sekine et al. | 375/140 |
| 5,689,524 A | * | 11/1997 | Takaki et al. | 375/145 |
| 6,038,250 A | * | 3/2000 | Shou et al. | 375/143 |
| 6,173,006 B1 | * | 1/2001 | Kent et al. | 375/145 |
| 6,201,870 B1 | * | 3/2001 | Medard et al. | 380/46 |
| 6,226,315 B1 | * | 5/2001 | Sriram et al. | 375/140 |
| 6,266,331 B1 | * | 7/2001 | Baker et al. | 370/335 |
| 6,272,168 B1 | * | 8/2001 | Lomp et al. | 375/222 |
| 6,275,558 B1 | * | 8/2001 | Ichihara | 377/64 |
| 6,324,205 B1 | * | 11/2001 | Prasad | 375/130 |
| 6,377,539 B1 | * | 4/2002 | Kang et al. | 370/209 |
| 6,385,180 B1 | * | 5/2002 | Maru | 370/335 |
| 6,389,138 B1 | * | 5/2002 | Li et al. | 380/35 |
| 6,445,714 B1 | * | 9/2002 | d'Anjou et al. | 370/441 |
| 6,512,753 B1 | * | 1/2003 | Kim et al. | 370/335 |

OTHER PUBLICATIONS

Kevin Laird, "Response to IS-95C V&V DDR 9-11," TR45.5.3.1/99.03.1801, Motorola (Mar., 1999).

* cited by examiner

*Primary Examiner*—Charles Appiah

(57) ABSTRACT

A long code generator is disclosed that maintains a common long code state between a system with multiple spreading rates, such as a spreading rate equal to the chip rate (1x) and a spreading rate at a multiple of the chip rate (nx), such as three-times the chip rate (3x). An nx long code generator generates n bits for every clock pulse, where the clock operates at the system chip rate. n bits are generated for every clock period by having the long code mask value assume n values for each clock period. Thus, the long code mask value is changed at n times the chip rate, while the shift register is operated at the chip rate. Each of the long codes corresponding to the n long code mask values are multiplexed, for example, using an interlacing technique. The long code generator includes a conventional shift register, AND gate array, modulo-2 adder and clock. In addition, the disclosed long code generator includes a novel long code mask generator that generates n long code masks for each clock period. The long code mask generator operates with a chip rate of n-times the system clock (nx1.2288 MHz). The three long code masks generated for each user must be different from one another, and different from the three long code masks generated for all other users. All the randomness properties necessary for proper CDMA operation are preserved. The present invention applies to both the forward and reverse links for long code generation. Long code state synchronization is maintained between two systems employing different spreading rates, thereby facilitating handoffs without explicit messaging of state information.

19 Claims, 4 Drawing Sheets

METHOD AND APPARATUS FOR GENERATION OF CDMA LONG CODES

FIELD OF THE INVENTION

The present invention relates to wireless communication systems, and more particularly, to methods and apparatus for generating CDMA long codes in a wireless communication system.

BACKGROUND OF THE INVENTION

Code division multiple access (CDMA) techniques have been employed in many digital wireless communication systems to permit a large number of system users to communicate with one another. Many communication systems utilizing code division multiple access (CDMA) techniques comply with the IS-95 standard, adopted by the Telecommunication Industry Association (TIA). Under the IS-95 standard, a communication system modulates the information signals with Walsh orthogonal function sequences. To produce corresponding orthogonal information signals, these CDMA systems require that the forward link information signals be transmitted in a synchronized manner. A more detailed discussion of the IS-95 standard is provided in "Mobile Station-Base Station Compatibility Standard for Dual-Mode Wideband Spread Spectrum Cellular System," Telecommunication Industry Association Doc. No. TIA/EIA/IS-95 (1993), incorporated by reference herein.

Wireless communications systems, including CDMA systems, are increasingly utilized to transmit voice and data communications. A mobile station desiring a connection to a called party employs an access channel to supply the base station with the dialing number of the called party and an identification of the mobile station (calling party). Thereafter, traffic channels are employed for communications between the calling and the called parties by means of the base station. Generally, users do not want the content of the communication to be publicly available. Without proper cryptographic precautions, however, the communications in a wireless system can be intercepted. Thus, communications in CDMA systems and other wireless systems are typically encrypted to prevent an eavesdropper from accessing the transmission.

FIG. 1 illustrates the manner in which speech signals are encrypted in a conventional CDMA system. As shown in FIG. 1, at the transmitter 100, user data is encrypted by a scrambler/spreader 130 using a short code and a long code produced by a short and a long code generator 110, 120, respectively. At the receiver 150, the encrypted signal is operated on by the inverse process, using the same short and long code to reproduce the original data stream. For a more detailed discussion of speech encryption techniques under the IS-95 standard, see, for example, "Mobile Station-Base Station Compatibility Standard for Dual-Mode Wideband Spread Spectrum Cellular System," Telecommunication Industry Association Doc. No. TIA/EIA/IS-95 (1993), incorporated by reference above.

Generally, the short code shown in FIG. 1 is a pseudo-random sequence that differentiates each base station in the CDMA system. Long codes are utilized to differentiate mobile stations. Under the IS-95 standard, the long code is a pseudo-random sequence with a period of $2^{42}-1$ chips that is used for scrambling on the forward (base station to mobile) CDMA channel and for spreading on the reverse (mobile to base station) CDMA channel. Thus, the long code provides limited privacy and uniquely identifies a mobile station on both the forward and reverse traffic channels.

The Telecommunication Industry Association (TIA) has recently adopted a new standard for CDMA networks, referred to as the IS-2000 standard (CDMA-2000). For a detailed discussion of the IS-2000 standard, see, for example, IS-2000.2, "Physical Layer Standard for CDMA-2000 Spread Spectrum System," Telecommunication Industry Association Doc. No. TIA/EIA/IS-2000, incorporated by reference herein. Among other changes to the IS-95 standard, the IS-2000 standard contemplates base stations and mobile stations that communicate using a plurality of spreading rates. Thus, while IS-95 originally contemplated communications having a spreading rate equal to the chip rate of 1.2288 mega-chips-per-second (Mcps), referred to herein as a 1× system, IS-2000 contemplates a number of spreading rates, such as a spreading rate equal to three-times the 1× system chip rate, referred to herein as a 3× system. To implement a spreading rate equal to three-times the 1× system chip rate (3×), the short and long code sequences may be generated by clocking the code generators 110, 120 at three-times the 1× system chip rate (3×1.2288 MHz).

In communication systems that employ more than one spreading rate, however, such as 3× and 1× spreading rates, there are difficulties in handoffs between the 3× and 1× sub-systems. Specifically, the long code state for the two systems are different due to the fact that the long code generators are clocked at different chip rates between the two systems. A need therefore exists for a method and apparatus for generating CDMA long codes that can operate in communication systems employing more than one spreading rate. A further need exists for a method and apparatus for generating CDMA long codes that maintains long code state synchronization between two systems employing different spreading rates.

SUMMARY OF THE INVENTION

Generally, a long code generator is disclosed that maintains a common long code state between a system with multiple spreading rates, such as a spreading rate equal to the 1× chip rate and a spreading rate at a multiple of the 1× chip rate (n×), such as three-times the 1× chip rate (3×). If not otherwise specified herein, the term "chip rate" or "system chip rate" refers to the 1× chip rate. An n× long code generator of the present invention generates n bits for every clock pulse, where the clock operates at the system chip rate. The n× long code generator generates n bits for every clock period by having the long code mask value assume n values for each clock period. Thus, the long code mask value is changed at n times the chip rate, while the state of the long code is advanced at the chip rate. Each of the long codes corresponding to the n long code mask values are multiplexed, for example, using an interlacing technique. Thus, the n long code outputs are multiplexed to a single bit stream.

The long code generator includes a conventional (feedback) shift register, AND gate array, modulo-2 adder and clock. In addition, the disclosed long code generator includes a long code mask generator that generates n long code masks for each clock period. Thus, the long code mask generator operates with a chip rate of n-times the system chip rate (n×1.2288 MHz). A long code multiplexer interlaces each of the long codes corresponding to the n long code mask values, for example, by alternating individual bits from each of the n generated long codes.

In one implementation, a clock source operating at three-times the system chip rate drives a divide-by-three counter that cycles through states 00, 01, 10, respectively, at bit positions 38 and 39 of the 42 bit mask. The state of the divide-by-three counter is logically added to the conventional 42-bit long code mask using an adder, to produce three long code masks for each clock period. Thus, for a counter state of 00, the conventional long code mask will be unchanged, for a counter state of 01, the 38$^{th}$ bit of the conventional long code mask will be changed and for a counter state of 10, the 39$^{th}$ bit of the conventional long code mask will be changed. The three long code masks generated for each user must be different from one another, and different from the three long code masks generated for all other users to ensure that the long codes generated will be unique among different users.

The present invention effectively cycles through n distinct long code masks for each clock tick, thereby generating an nx rate long code. All the randomness properties necessary for proper CDMA operation are preserved. Furthermore, the present invention is equally applicable on both the forward and reverse links for long code generation. Thus, the present invention maintains long code state synchronization between two systems employing different spreading rates, thereby facilitating handoffs without explicit messaging of state information of the long code generator. The lower clocking rate for the long code generators of the present invention also reduces power consumption. In addition, the present invention allows identical hardware to be used in dual-mode terminals for both 1× and n× spreading rates.

A more complete understanding of the present invention, as well as further features and advantages of the present invention, will be obtained by reference to the following detailed description and drawings.

DETAILED DESCRIPTION

Figure 1:
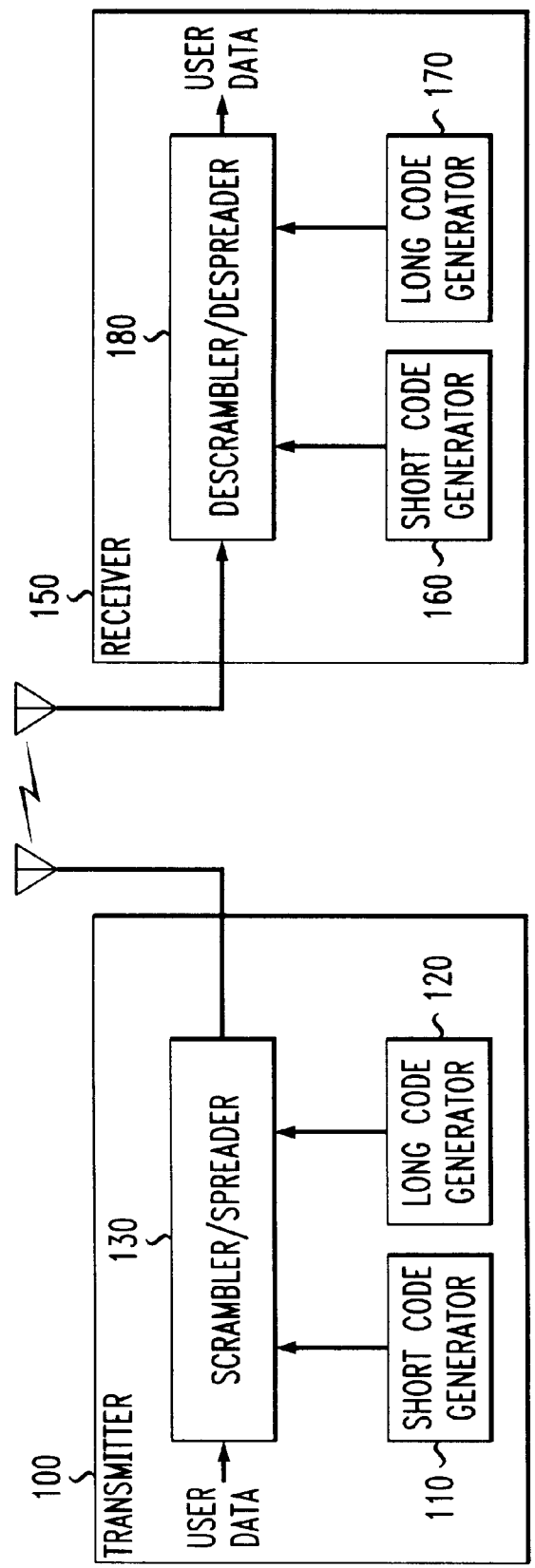
FIG. 1 is a block diagram of an illustrative conventional transmitter and receiver in a wireless communication system where the present invention may operate.
Figure 2:
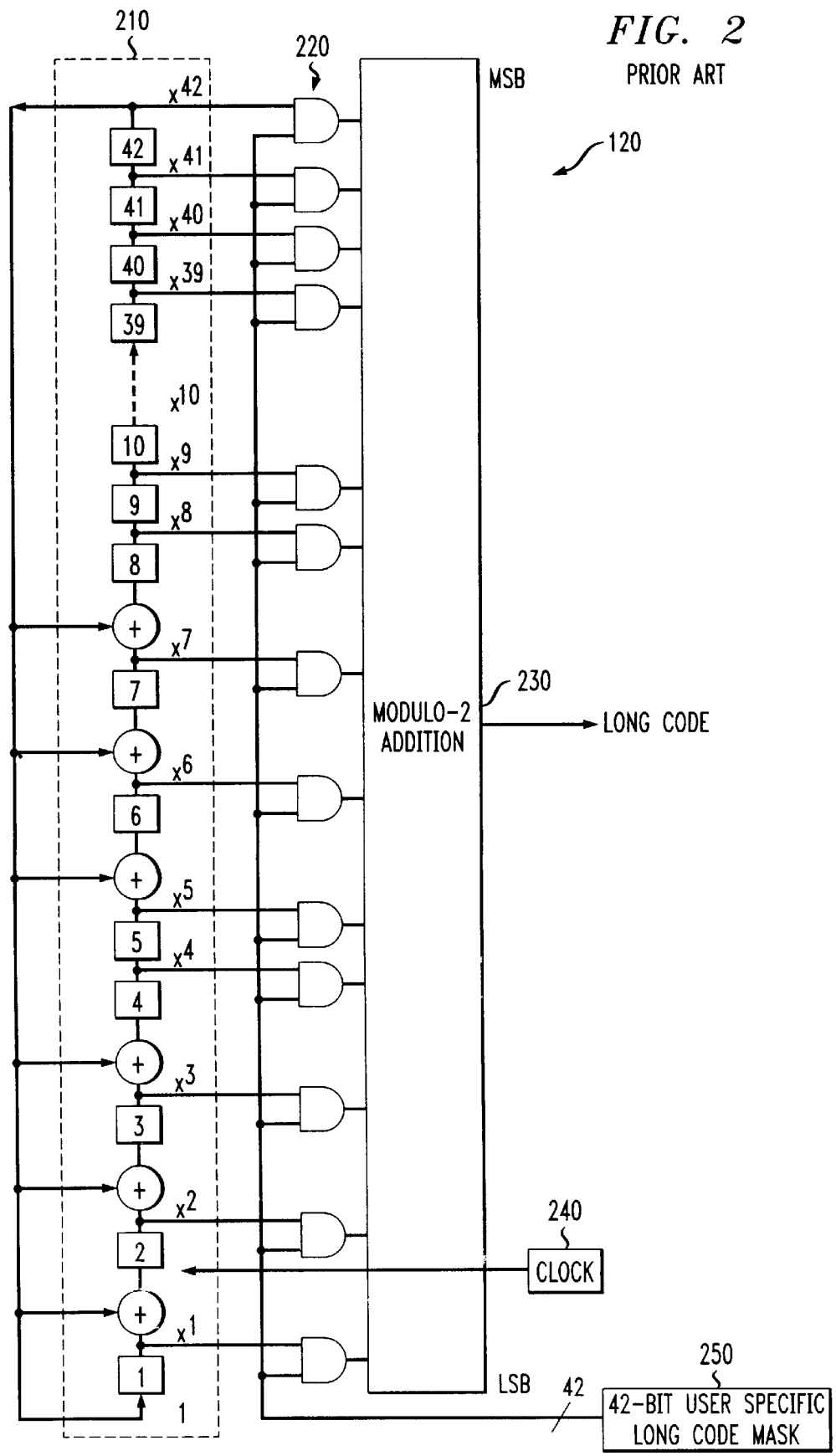
FIG. 2 is a schematic block diagram of the long code generator of FIG. 1 in further detail.

To implement the encryption scheme shown in FIG. 1, each chip of the long code is generated by the long code generator 120, and the particular long code sequence is determined by a long code mask input to the long code generator 120. FIG. 2 illustrates the long code generator 120 of FIG. 1 in further detail. As shown in FIG. 2, the long code generator 120 includes a 42 bit shift register 210 that is connected as a sequence generator having $2^{42}$ states.

Generally, the shift register 210 is initially loaded with a specific system state provided by the base station to the mobile station during the call set-up processing. For each state, the output of each of the 42 register stages is logically multiplied (using an array of 42 AND gates 220) with one of the 42 mask bits from a user-specific 42-bit long code mask 250. The long code mask 250 includes user-specific information, such as the electronic serial number (ESN) of the mobile station, in a known manner. The long code mask 250 serves to provide a unique time shift of the $2^{42}$–1 bit long code sequence, even though the value in the shift register 210 is the same for all users.

Thereafter, the 42 AND gate outputs are added using a modulo-2 adder 230 to produce the long code chip, where an even number of "1"s gives a logic value of "0" and an odd number of "1"s gives a logic value of "1." In a conventional system, the chip rate of the clock 240 is equal to the system chip rate (1.2288 MHz). The long code generator 120 shown in FIG. 2 may be embodied as a maximal length linear shift register, such as those described in Andrew J. Viterbi, "CDMA: Principles of Spread Spectrum Communication," Section 2.2.1 (Addison Wesley, 1995), incorporated by reference herein.

Figure 3:
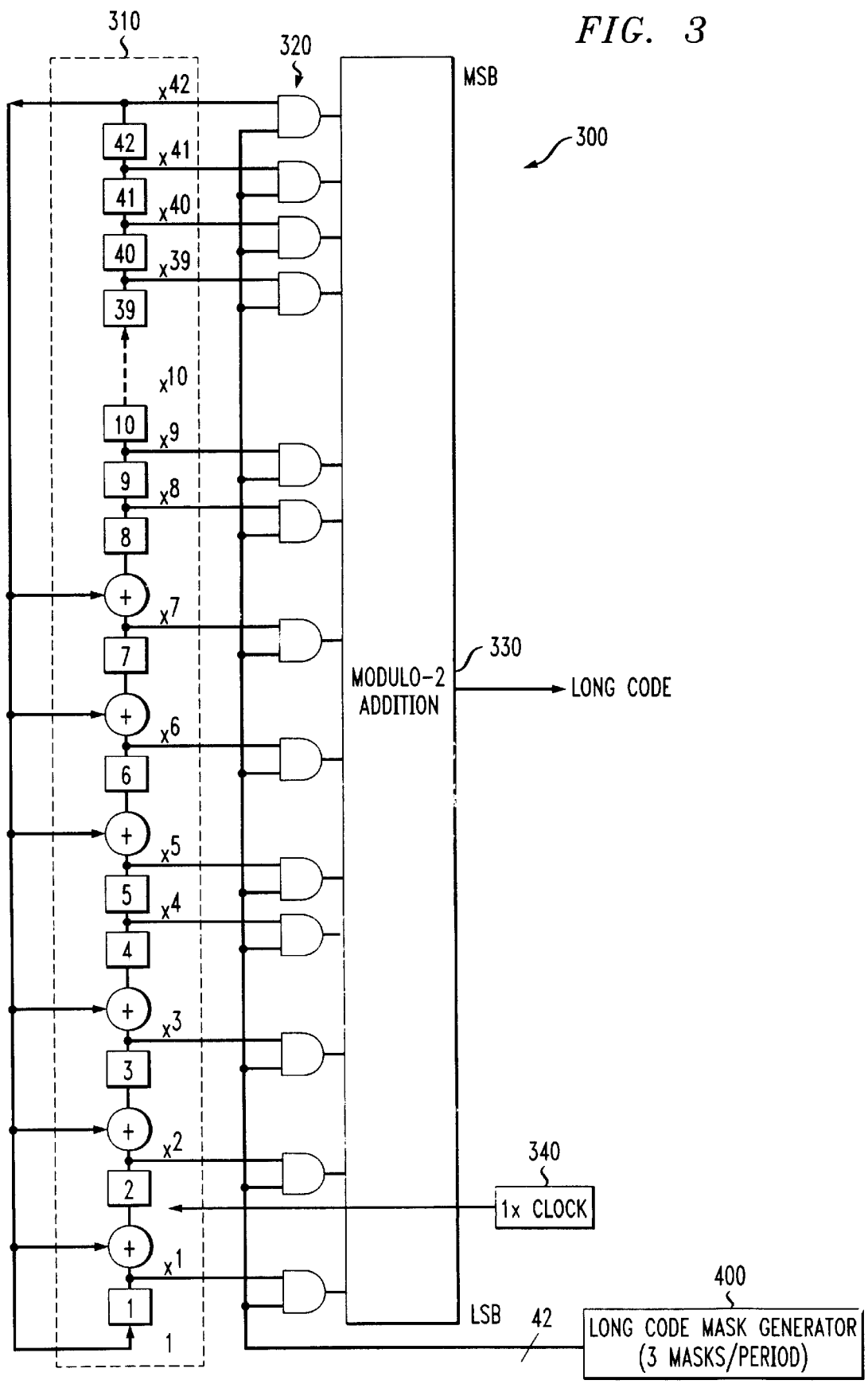
FIG. 3 is a schematic block diagram of a long code generator suitable for use in the transmitter and receiver of FIG. 1 in accordance with the present invention.

According to one feature of the present invention, a long code generator is provided that maintains a common long code state between a system with a spreading rate equal to the chip rate and a system having a spreading rate at a multiple of the chip rate, such as three-times the chip rate. A long code generator 300 in accordance with the present invention is shown in FIG. 3. Generally, a 3× long code generator 300 of the present invention generates three (3) bits for every clock pulse, where the clock operates at the system chip rate (1.2288 MHz). The 3× long code generator 300 generates three (3) bits for every clock period by having the long code mask value assume three values for each clock period. In other words, the long code mask value is changed at three times the chip rate, while the shift register is operated at the chip rate. Each of the long codes corresponding to the three long code mask values are multiplexed, for example, using an interlacing technique. Thus, the three long code outputs are multiplexed to a single bit stream producing a 3× long code of length 3($2^{42}$–1).

FIG. 3 illustrates a long code generator 300 in accordance with the present invention. The shift register 310, array of AND gates 320, modulo-2 adder 330 and clock 340 may be embodied as the conventional components 210, 220, 230, 240 of similar name that are included in the long code generator 120 of FIG. 2.

Figure 4:
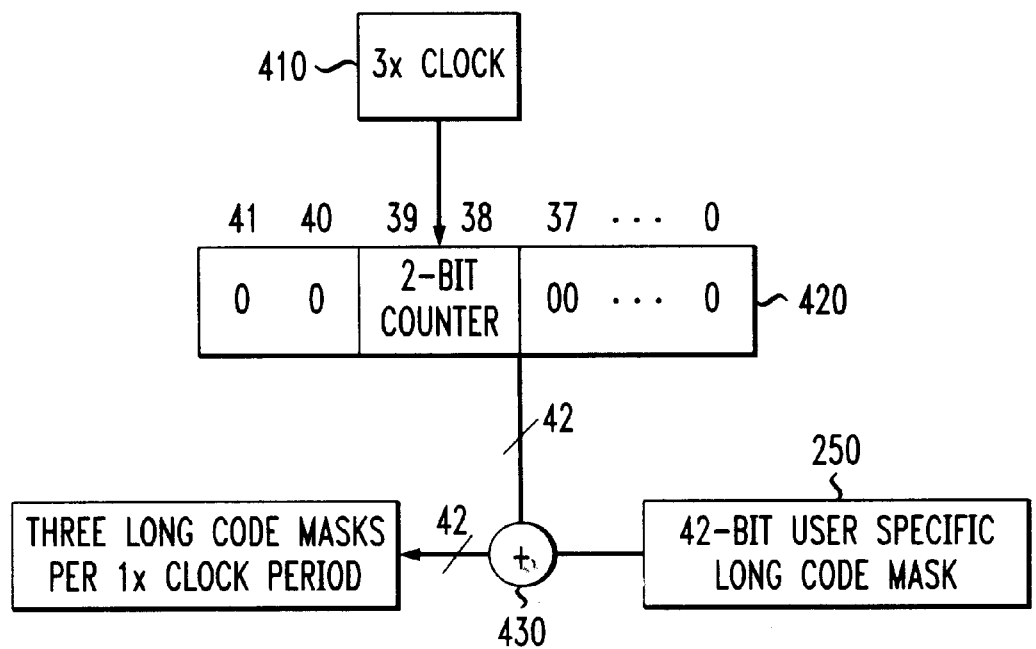
FIG. 4 is a schematic block diagram of an illustrative implementation of the long code mask generator of FIG. 3 in accordance with the present invention.

In addition, the long code generator 300 in accordance with the present invention includes a long code mask generator 400, discussed further in conjunction with FIG. 4, that generates three long code masks for each clock period. Thus, the long code mask generator 400 operates with a chip rate of three-times the system clock (3×1.2288 MHz). The long code generator 300 interlaces each of the long codes corresponding to the three long code mask values, for example, by alternating individual bits from each of the three generated long codes.

FIG. 4 shows an illustrative implementation of the long code mask generator 400. As shown in FIG. 4, a clock source 410 operating at three-times the system chip rate drives a divide-by-three counter 420 that cycles through states 00, 01, 10, respectively. The state of the divide-by-three counter 420 is logically added to the conventional 42-bit long code mask 250 using an adder 430, to produce three long code masks for each clock period. Thus, when the counter has a state of 00, the conventional long code mask will be unchanged, when the counter has a state of 01, the 38$^{th}$ bit of the conventional long code mask will be changed and when the counter has a state of 10, the 39$^{th}$ bit of the conventional long code mask will be changed. The three long code masks generated for each user must be different from one another, and different from the three long code masks generated for all other users. In the illustrative embodiment, this requirement is met by using bits 38 and 39 of the long code mask, which are not currently utilized under IS-95.

Figure 5:
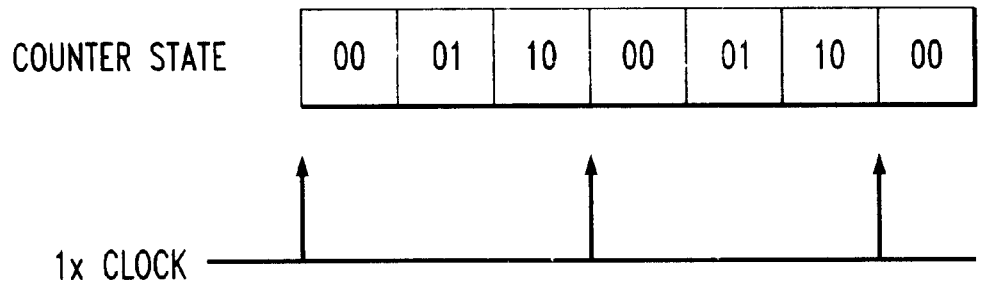
FIG. 5 shows an illustrative implementation for producing a 1× system clock at the system chip rate using the divide-by-three counter of FIG. 4 running at the 3× chip rate.

FIG. 5 shows an illustrative implementation of a clock signal at the system chip rate, that can be produced by the divide-by-three counter 420 of FIG. 4. As shown in FIG. 5, the chip rate signal (1×) can be generated by generating a rising edge each time the divide-by-three counter 420 has a value of 00. In other words, the shift register 310 can be clocked when the counter 420 jumps from state 10 to state 00.

The present invention effectively cycles through three distinct long code masks for each 1× clock tick, thereby generating a 3× rate long code. All the randomness properties necessary for proper CDMA operation are preserved. The present invention can be extended to higher spreading rate systems, by using bits 38 through 41, for example, to cover a spreading rate of 12×, as would be apparent to a person of ordinary skill in the art. Furthermore, the present invention is equally applicable on both the forward and reverse links for long code generation.

Since the long code sequence generated by the present invention is equivalent to three time shifted versions of the $2^{42}-1$ bit long code interlaced in time, this is not a true PN sequence. However, the cross correlation property between the long code sequences of two different users is equivalent to that of true PN sequences, since the three masks used by one user are distinct from the three masks used by a different user. Hence, the delays as a result of the masking operation are different among different users. The partial cross correlation of two long code sequences (C1 and C2) satisfies (for odd N) the following expression:

$$E\{\Sigma_N C1[n]C2[n+k]\}=1/N, k!=0.$$

It is to be understood that the embodiments and variations shown and described herein are merely illustrative of the principles of this invention and that various modifications may be implemented by those skilled in the art without departing from the scope and spirit of the invention.

We claim:

1. A method for generating a long code in a CDMA system having a first spreading rate equal to the chip rate (1×) and a second spreading rate at a multiple of the chip rate (n×), said method comprising the steps of:
    generating n long code masks for each clock cycle of said first spreading rate;
    generating n long codes at said first spreading rate, each corresponding to one of the n long code masks; and
    multiplexing the n long codes to produce a long code at said second spreading rate.

2. The method of claim 1, wherein said multiplexing step comprises the step of interlacing said n long codes at said first spreading rate.

3. The method of claim 1, wherein said n long codes are generated by advancing a shift register that is loaded with a value representing a long code synchronization state.

4. The method of claim 3, wherein said long code synchronization state is obtained from a base station during a call-setup phase.

5. The method of claim 1, wherein said n long code masks generated for each user must be different from one another, and different from the n long code masks generated for all other users.

6. The method of claim 1, further comprising the step of maintaining long code state synchronization between two systems employing said different spreading rates during a handoff.

7. A long code generator for use in a CDMA system having a first spreading rate equal to the chip rate (1×) and a second spreading rate at a multiple of the chip rate (n×), comprising:
    a long code mask generator that generates n long code masks for each clock cycle of said first spreading rate;
    a shift register for generating n long codes at said first spreading rate, each corresponding to one of the n long code masks;
    an array of AND gates for multiplying a state of said shift register with said long code mask; and
    an adder for summing said outputs of said array of AND gates to produce a long code value at said second spreading rate.

8. The long code generator of claim 7, wherein said long code mask generator comprises a divide-by-n counter that cycles through n states at said second spreading rate and an adder for logically adding the state of said divide-by-n counter to a long code mask to produce said n long code masks for each clock period of said first spreading rate.

9. The long code generator of claim 7, wherein said n long code masks generated for each user must be different from one another, and different from the n long code masks generated for all other users.

10. The long code generator of claim 8, wherein said first spreading rate chip rate signal can be generated by generating a rising edge each time said divide-by-n counter has a predefined value.

11. The long code generator of claim 7, wherein said adder sums said outputs of said array of AND gates.

12. The long code generator of claim 7, wherein said shift register is loaded with a value representing a long code synchronization state.

13. The long code generator of claim 12, wherein said long code synchronization state is obtained from a base station during a call-setup phase.

14. A long code generator for use in a CDMA system having a first spreading rate equal to the chip rate (1×) and a second spreading rate at a multiple of the chip rate (n×), comprising:
    a shift register having a plurality of cells operating at said first spreading rate;
    a long code mask generator comprising a divide-by-n counter that cycles through n states at said second spreading rate and an adder for logically adding a state of said divide-by-n counter to a long code mask to produce n long code masks for each clock period of said first spreading rate;
    an array of AND gates for multiplying an output of each of said cells with a corresponding bit of each of said long code masks; and
    an adder for combining said outputs of said array of AND gates to produce a long code value at said second spreading rate.

15. The long code generator of claim 14, wherein said n long code masks generated for each user must be different from one another, and different from the n long code masks generated for all other users.

16. The long code generator of claim 14, wherein said first spreading rate chip rate signal can be generated by generating a rising edge each time said divide-by-n counter has a predefined value.

17. The long code generator of claim 14, wherein said adder combines said output of said array of AND gates.

18. The long code generator of claim 14, wherein said shift register is loaded with a value representing a long code synchronization state.

19. The long code generator of claim 18, wherein said long code synchronization state is obtained from a base station during a call-setup phase.

* * * * *